US008666556B2

(12) United States Patent
Agahi (10) Patent No.: US 8,666,556 B2
(45) Date of Patent: Mar. 4, 2014

(54) SYSTEMS AND METHODS FOR DYNAMIC FEEDFORWARD (75) Inventor: Daryush Agahi, Irvine, CA (US)

(73) Assignee: Alcon Research, Ltd., Fort Worth, TX (US)

( * ) Notice: Subject to any disclaimer, the term of this patent is extended or adjusted under 35 U.S.C. 154(b) by 1113 days.

(21) Appl. No.: 12/634,870

(22) Filed: Dec. 10, 2009

(65) Prior Publication Data

US 2011/0144813 A1  Jun. 16, 2011

(51) Int. Cl.
| F16K 31/36 | (2006.01) |
| G01C 17/38 | (2006.01) |
| G01F 11/00 | (2006.01) |
| G01K 15/00 | (2006.01) |
| G01L 27/00 | (2006.01) |
| G05B 13/02 | (2006.01) |
| G05D 7/00 | (2006.01) |

(52) U.S. Cl.
USPC .......... 700/282; 700/28; 700/32; 700/33; 700/34; 700/37; 700/45; 700/54; 137/486; 222/1; 702/94; 702/98; 702/99

(58) Field of Classification Search
USPC .......... 700/28, 32–34, 37, 44, 54, 282, 45; 137/486; 222/1; 702/94, 98, 99
See application file for complete search history.

(56) References Cited

U.S. PATENT DOCUMENTS

| 812,162 A | 2/1906 | Bemis |
| 2,707,389 A | 5/1955 | Fortier |
| 3,084,674 A | 4/1963 | Watson |
| 3,477,665 A | 11/1969 | Legrand |
| 3,703,139 A | 11/1972 | Furlong |
| 3,854,382 A | 12/1974 | Walters et al. |
| 3,867,934 A | 2/1975 | Ollivier |
| 4,077,567 A | 3/1978 | Ginn et al. |

(Continued)

FOREIGN PATENT DOCUMENTS

| DE | 3708989 A1 | 10/1988 |
| DE | 10247869 A1 | 5/2004 |

(Continued)

OTHER PUBLICATIONS

International Searching Authority, International Search Report, International Application No. PCT/US2010/0055054, Mar. 24, 2011, 4 pages.

(Continued)

*Primary Examiner* — Mohammad Ali
*Assistant Examiner* — Jennifer L Norton (57) ABSTRACT

In some embodiments, a method of using feedforward to control a system component may include determining if a feedforward term exists in a feedforward table for a received operating set point. If a feedforward term does not exist, the system component may be incremented until the system is within a first acceptable tolerance of the desired set point. In some embodiments, a measure of steady state error may be determined and compared to a second acceptable tolerance. If within the acceptable tolerance, the corresponding feedforward term may be recorded in the feedforward table. In some embodiments, if the feedforward term exists for the operating set point, the system component may be controlled using controller output that corresponds to the feedforward term. When a change to the system is detected that is associated with possible changes to the feedforward values, new feedforward values may be generated for the feedforward table.

19 Claims, 6 Drawing Sheets

(56) References Cited

U.S. PATENT DOCUMENTS

| | | | |
|---|---|---|---|
| 4,086,804 A | 5/1978 | Ruby | |
| 4,164,167 A | 8/1979 | Imai et al. | |
| 4,323,064 A | 4/1982 | Hoenig et al. | |
| 4,331,130 A | 5/1982 | Lewicky | |
| 4,335,867 A | 6/1982 | Bihlmaier | |
| 4,344,144 A | 8/1982 | Damico et al. | |
| 4,476,532 A | 10/1984 | Akiyama et al. | |
| 4,590,935 A | 5/1986 | Ranalli | |
| 4,622,503 A | 11/1986 | Sundblom et al. | |
| 4,650,460 A | 3/1987 | Roizenblatt | |
| 4,650,462 A | 3/1987 | DeSatnick et al. | |
| 4,706,687 A | 11/1987 | Rogers et al. | |
| 4,757,814 A | 7/1988 | Wang et al. | |
| 4,770,654 A | 9/1988 | Rogers et al. | |
| 4,790,816 A | 12/1988 | Sundblom et al. | |
| 4,810,242 A | 3/1989 | Sundblom et al. | |
| 4,840,111 A | 6/1989 | Garnjost | |
| 4,933,843 A | 6/1990 | Scheller et al. | |
| 5,020,315 A | 6/1991 | Leachman, Jr. et al. | |
| 5,020,825 A | 6/1991 | Lizell | |
| 5,092,178 A | 3/1992 | Vanderlaan | |
| 5,106,364 A | 4/1992 | Hayafuji et al. | |
| 5,138,564 A * | 8/1992 | de Jong et al. | 702/96 |
| 5,154,207 A | 10/1992 | Bolt | |
| 5,314,295 A | 5/1994 | Lukkari et al. | |
| 5,380,280 A | 1/1995 | Peterson | |
| 5,403,276 A | 4/1995 | Schechter et al. | |
| 5,417,246 A | 5/1995 | Perkins et al. | |
| 5,437,241 A | 8/1995 | Rosenberg | |
| 5,445,773 A | 8/1995 | Arai | |
| 5,457,625 A * | 10/1995 | Lim et al. | 700/29 |
| 5,549,139 A | 8/1996 | Perkins et al. | |
| 5,550,685 A | 8/1996 | Drouin | |
| 5,587,536 A | 12/1996 | Rasmussen | |
| 5,630,827 A | 5/1997 | Vijfvinkel | |
| 5,674,194 A | 10/1997 | Jung et al. | |
| 5,791,142 A | 8/1998 | Layne et al. | |
| 5,808,396 A | 9/1998 | Boukhny | |
| 5,810,765 A | 9/1998 | Oda | |
| 5,829,335 A | 11/1998 | Ewald et al. | |
| 5,846,257 A | 12/1998 | Hood | |
| 5,857,485 A | 1/1999 | Perkins et al. | |
| 5,959,390 A | 9/1999 | Boukhny | |
| 5,979,494 A | 11/1999 | Perkins et al. | |
| 6,162,187 A | 12/2000 | Buzzard et al. | |
| 6,425,883 B1 | 7/2002 | Urich et al. | |
| 6,450,966 B1 | 9/2002 | Hanna | |
| 6,575,264 B2 | 6/2003 | Spadafora | |
| 6,575,990 B1 | 6/2003 | Wang et al. | |
| 6,678,584 B2 | 1/2004 | Junk et al. | |
| 6,730,106 B2 | 5/2004 | Kanda et al. | |
| 6,848,323 B2 | 2/2005 | Krouth et al. | |
| 6,892,745 B2 | 5/2005 | Benson | |
| 6,954,683 B2 | 10/2005 | Junk et al. | |
| 6,999,853 B2 | 2/2006 | Junk et al. | |
| 7,263,877 B2 | 9/2007 | Schaefer et al. | |
| 7,283,321 B1 | 10/2007 | Sun et al. | |
| 7,335,217 B2 | 2/2008 | Wang et al. | |
| 7,352,287 B2 | 4/2008 | Rupert | |
| 7,470,277 B2 | 12/2008 | Finlay et al. | |
| 7,600,405 B2 | 10/2009 | Maurer et al. | |
| 7,628,054 B2 | 12/2009 | Hajishah et al. | |
| 7,640,119 B2 | 12/2009 | Khashayar | |
| 7,708,734 B2 | 5/2010 | Khashayar | |
| 7,775,052 B2 | 8/2010 | Cornwell et al. | |
| 8,038,692 B2 | 10/2011 | Valencia et al. | |
| 8,157,145 B2 | 4/2012 | Shelton et al. | |
| 8,162,000 B2 * | 4/2012 | Turner et al. | 137/487.5 |
| 8,187,293 B2 | 5/2012 | Kirchhevel | |
| 8,215,108 B2 | 7/2012 | Hahn et al. | |
| 8,230,877 B2 | 7/2012 | Roberge et al. | |
| 2003/0195538 A1 | 10/2003 | Wang et al. | |
| 2003/0208305 A1 | 11/2003 | Junk et al. | |
| 2004/0154466 A1 | 8/2004 | Gethmann et al. | |
| 2005/0245909 A1 | 11/2005 | McCary et al. | |
| 2006/0238739 A1 * | 10/2006 | Butler | 355/72 |
| 2006/0271082 A1 | 11/2006 | Kirchhevel et al. | |
| 2007/0093793 A1 | 4/2007 | Maurer et al. | |
| 2007/0185512 A1 | 8/2007 | Kirchhevel | |
| 2007/0219647 A1 | 9/2007 | Heertjes et al. | |
| 2008/0110236 A1 | 5/2008 | Hajishah et al. | |
| 2008/0172077 A1 | 7/2008 | Valencia et al. | |
| 2009/0203480 A1 | 8/2009 | Petzold et al. | |
| 2009/0259242 A1 | 10/2009 | Gerg et al. | |
| 2009/0305214 A1 * | 12/2009 | Pybus et al. | 434/268 |
| 2010/0145374 A1 | 6/2010 | Perkins et al. | |
| 2010/0305596 A1 | 12/2010 | Peterson et al. | |
| 2011/0005387 A1 | 1/2011 | Ehre et al. | |
| 2011/0299943 A1 | 12/2011 | Woolever | |
| 2012/0055329 A1 | 3/2012 | Heer | |

FOREIGN PATENT DOCUMENTS

| | | |
|---|---|---|
| DE | 10247869 B4 | 2/2007 |
| EP | 0469641 B1 | 6/1989 |
| EP | 0626628 A1 | 11/1994 |
| EP | 0630494 B1 | 7/1996 |
| EP | 0626628 B1 | 12/1997 |
| EP | 0673475 B1 | 6/1998 |
| EP | 0495044 B1 | 9/1998 |
| EP | 0874163 A2 | 10/1998 |
| EP | 0874163 A3 | 3/1999 |
| EP | 1074271 A2 | 2/2001 |
| EP | 1074271 A3 | 2/2002 |
| EP | 1074271 B1 | 10/2004 |
| EP | 1660244 B1 | 12/2006 |
| EP | 2032878 B1 | 12/2009 |
| FR | 2905594 A1 | 3/2001 |
| GB | 1189493 | 6/1970 |
| GB | 1 213 723 A | 11/1970 |
| GB | 1 323 788 A | 7/1973 |
| GB | 1417299 | 12/1975 |
| GB | 2 140 871 A | 12/1984 |
| GB | 2203195 A | 10/1988 |
| GB | 792397 | 10/1995 |
| JP | 07259801 | 10/1995 |
| JP | 09225698 | 2/1997 |
| JP | 9311091 A | 12/1997 |
| JP | 201057642 | 3/2010 |
| WO | 9825556 A1 | 6/1998 |
| WO | WO 00/78371 A1 | 12/2000 |
| WO | 0130281 A1 | 5/2001 |
| WO | 2008/000599 A1 | 1/2008 |
| WO | WO 2010/066302 A1 | 6/2010 |
| WO | WO 2011/071613 A1 | 6/2011 |
| WO | 2011138102 A1 | 11/2011 |

OTHER PUBLICATIONS

International Searching Authority, Written Opinion of the International Searching Authority, International Application No. PCT/US2010/055054, Mar. 24, 2011, 9 pages.

Daoutidis, Prodromos, et al., "Dynamic Feedforward/Output Feedback Control of Nonlinear Processes," 1995, pp. 1889-1907, 1995, vol. 50, No. 12, Chemical Engineering Science, Great Britain.

Liu, Biao, "Adaptive Feedforward Controllers for Active Noise Control," Dissertation, Jul. 2000, 126 pgs., Shaker Verlag GmbH, Germany.

Jung, C., et al, "Pressure control of a nonlinear system with a linear-PMSM and a standard inverter," Electric Machines and Drives Conference, 2009, IEMDC '09, IEEE International, IEEE, Piscataway, NJ, USA, May 3, 2009, pp. 83-88, XP031475755, ISBN: 978-1-4244-4251-5.

Buchanan, P.R., et al., "Recovery of ventilation distributions by gas wash-out of a mechanical pump," Clin. Phys. Physiol. Meas., Great Britain, 1986, pp. 237-252, vol. 7, No. 3.

Ellis, George and Gollomp, Bernard P.; "Microcomputer-controlled precision pneumatic pressure generator;" IEEE Transactions on Instrumentation and Measurement, Sep. 3, 1977, pp. 214-217, vol. IM-26, No. 3.

Johnson, Kenneth S., et al., "A submersible Flow Analysis System", The Netherlands, Analytica Chimica, Acta, 1986, pp. 245-257, vol. 179.

(56) References Cited

OTHER PUBLICATIONS

Kabei, N., et al., "A portable pneumatic driving unit for a left ventricular assist device", Artificial Heart, the International Journal of Artificial Organs, 1988, pp. 186-190, vol. 11, No. 3.

Nachlas, Marvin M., et al., "New Method: a simple portable pneumatic pump for external cardiac massage," the American Journal of Cardiology, 1962, pp. 107-109, vol. 10, No. 1.

Rogers, Richard C., "Brief Communication: an inexpensive picoliter-volume pressure ejection system," Brain Research Bulletin, USA, 1985, pp. 669-671, vol. 15, No. 6.

Tabassum, Alilm Abid, "Solar refrigeration: evaluation of technical options and design of solar-gener adsorber for a novel adsorption refrigerator", Tabassum Thesis, Cranfield University, Cranfield CERES, School of Engineering, http:// hdl.handle.net11826/4213, Sep. 1989, pp. 1-2.

Turkentine, R.B, and Williams, I.S., Apparatus and Techniques: "Pressure-operated shutter for thin-film monitor", J. Phys. E: Sci. Instrum., Great Britain, 1979, p. 17, vol. 12, No. 1.

Waldeck, J.L., "The development of a portable pressure source for the static and dynamic calibration of pressure transducers", Journal of Wind Engineering and Industrial Aerodynamics, The Netherlands, 1987, pp. 213-230, vol. 26, No. 2.

Whalen, Robert L. and Briskman, Richard N., "An electromagnetic pneumatic blood pump driver", Trans. Am. Soc. Artif. Intern Organs, 1988, pp. 721-725, vol. 34, No. 3.

Astrom, Karl Johan, et al., Adaptive Control, Dec. 31, 1994, Prentice Hall, pp. 118-119 and 160-165.

Phillips, Douglas Duane, The Application of Dynamic Feedforward Compensation to Linearized Process Control Systems, thesis, University of Minessota, 1969.

\* cited by examiner

| Pressure | Valve Position |
|---|---|
| 0-10 psi | 0% |
| 11-20 psi | 10% |
| 21-30 psi | 20% |
| 31-40 psi | 30% |
| 41-50 psi | 40% |
| 51-60 psi | 50% |
| 61-70 psi | 60% |
| 71-80 psi | 70% |
| 81-90 psi | 80% |
| 91-100 psi | 90% |

Table 201a

FIG. 2a

| Pressure | Input Valve Position | Exit Valve Position |
|---|---|---|
| 0-10 psi | 0% | 100% |
| 11-20 psi | 10% | 90% |
| 21-30 psi | 20% | 80% |
| 31-40 psi | 30% | 70% |
| 41-50 psi | 40% | 60% |
| 51-60 psi | 50% | 50% |
| 61-70 psi | 60% | 40% |
| 71-80 psi | 70% | 30% |
| 81-90 psi | 80% | 20% |
| 91-100 psi | 90% | 10% |

Table 201b

FIG. 2b

| Pressure | Valve Position |
|---|---|
| 0-10 psi | 0% |
| 11-20 psi | 11% |
| 21-30 psi | 22% |
| 31-40 psi | 33% |
| 41-50 psi | 44% |
| 51-60 psi | 55% |
| 61-70 psi | 66% |
| 71-80 psi | 77% |
| 81-90 psi | 88% |
| 91-100 psi | 99% |

Table 201c (Increasing)

| Pressure | Valve Position |
|---|---|
| 0-10 psi | 0% |
| 11-20 psi | 10% |
| 21-30 psi | 20% |
| 31-40 psi | 30% |
| 41-50 psi | 40% |
| 51-60 psi | 50% |
| 61-70 psi | 60% |
| 71-80 psi | 70% |
| 81-90 psi | 80% |
| 91-100 psi | 90% |

Table 201d (Decreasing)

SYSTEMS AND METHODS FOR DYNAMIC FEEDFORWARD

FIELD OF THE INVENTION

The present invention generally pertains to control algorithms. More particularly, but not by way of limitation, the present invention pertains to dynamic feedforward.

DESCRIPTION OF THE RELATED ART

Complex systems, such as surgical consoles, may include many different components that interact with each other and the environment. Controlling these systems (e.g., in view of received user input or a programmed response) may require control systems that manipulate the components to achieve the desired performance. Often these control systems may control many different components and use input from several different sources (e.g., user input, sensor input, etc).

SUMMARY

In various embodiments a method of using feedforward to control a system component may include subdividing an operating range of the system component into two or more set points or set point regions of operation, creating a feedforward table for mapping feedforward terms to the set points of operation, receiving an operating set point, and determining if a feedforward term exists for the operating set point. If a feedforward term does not exist for the operating set point, the system component may be incremented as needed using controller output to move the system to within a first acceptable tolerance of the desired set point. In some embodiments, a measure of steady state error for the system may be determined and compared to a second acceptable tolerance. If the measure of steady state error for the system is within the acceptable tolerance, the corresponding feedforward term may be recorded in the feedforward table for the current set point. If the measure of steady state error for the system is not within the second acceptable tolerance, the corresponding feedforward term may not be changed in the feedforward table.

In some embodiments, if the feedforward term exists for the operating set point, the system component may be controlled using controller output that corresponds to the feedforward term associated with the desired set point in the feedforward table to move the system toward the desired set point. When a change to the system is detected that is associated with possible changes to the feedforward values (e.g., a change in system temperature), new feedforward values may be generated for the feedforward table.

BRIEF DESCRIPTION OF THE DRAWINGS

For a more complete understanding of the present invention, reference is made to the following description taken in conjunction with the accompanying drawings in which.

It is to be understood that both the foregoing general description and the following detailed description are exemplary and explanatory only and are intended to provide a further explanation of the present invention as claimed.

DETAILED DESCRIPTION OF THE EMBODIMENTS

Surgical consoles may include a range of systems (e.g., pneumatic systems, fluidics systems, etc.) used to support functionality for various surgical devices (e.g., vitrectomy probe, phacoemulsification handpiece, etc). The surgical console may use one or more control systems (e.g., which include one or more controllers) to control and monitor different aspects of these systems. For example, control systems may collect data about a system (e.g., through user input, through one or more sensors, etc.) and send control signals (e.g., a valve position) within the system to achieve a desired performance parameter near a set point (e.g., a user requested or system desired performance parameter such as a desired pressure for an accumulator tank). In some embodiments, the set point may be received from a user (e.g., a desired pressure set by a footswitch) or may be a preprogrammed/default system set point (other sources of set points are also possible). In some embodiments, the control system may control the system, for example, by outputting a signal to move an actuator, move a valve, increase power output, etc.

Figure 3:
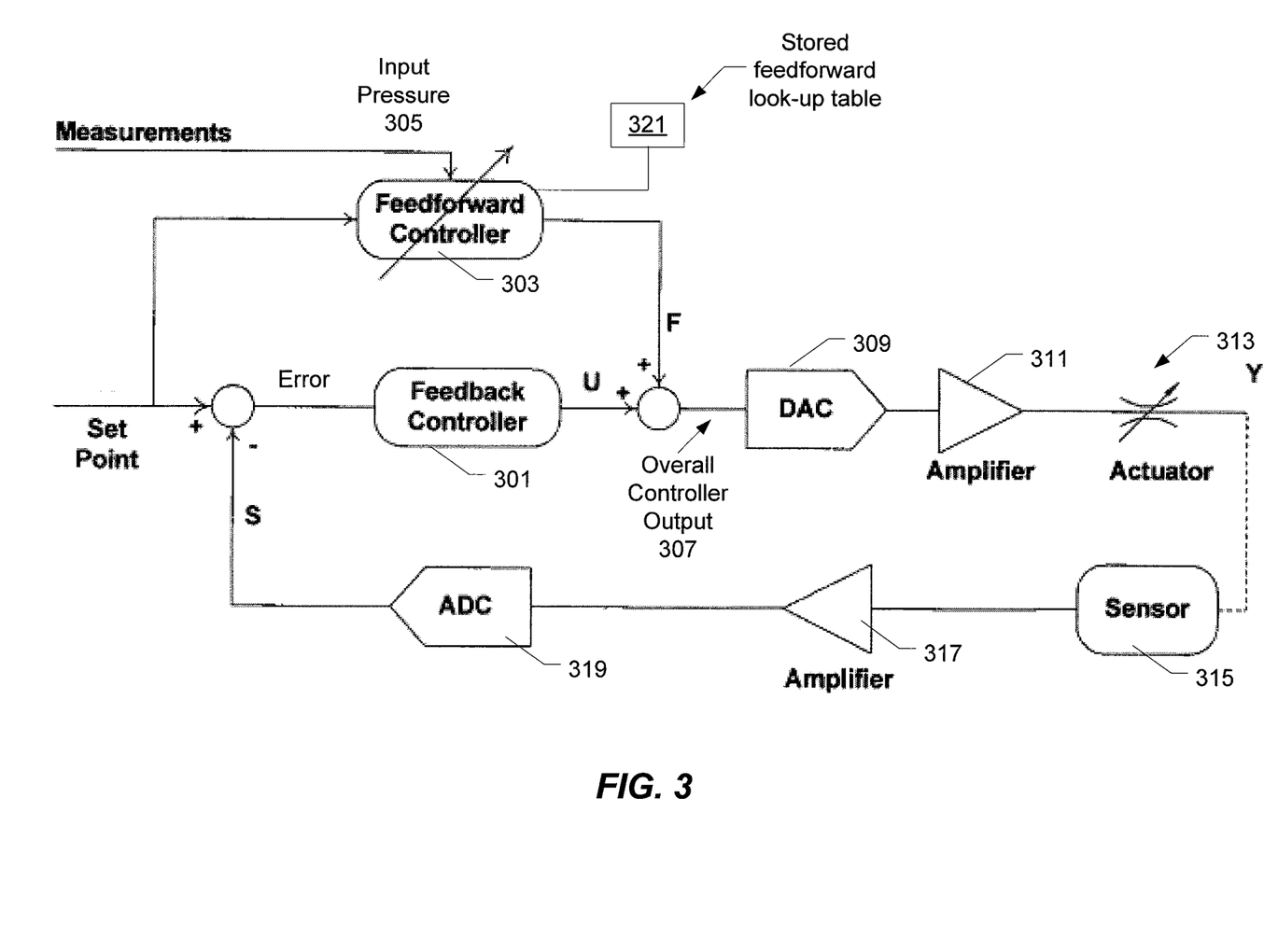
FIG. 3 illustrates a schematic of a system implementing feedforward, according to an embodiment.

In some embodiments, the control system (e.g., through feedback controller 301 as seen in FIG. 3) may change the system in increments (e.g., move the valve by an incremental percentage such as 1% open or by a positional increment such as 1 degree rotation). Other increment types are also possible. In some embodiments, a user may set the size of the increment or the increment size may be a predetermined default (a larger increment resolution may result in faster changes than a smaller increment, but may result in a higher probability of overshooting/undershooting the target). In some embodiments, the increments may be variable (e.g., the system may use smaller increments as the system gets closer to the target set point). After incrementing a system component, the control system may obtain new data (e.g., obtain a resulting pressure measurement from a pressure sensor). The system may determine if an additional adjustment is needed and may output a corresponding control signal (e.g., to move the valve by an additional incremental percentage (or undo a previous incremental move)). In some embodiments, the system may stop incrementing when the system is within a tolerance of the target set point. The tolerance may be received from a user or preprogrammed into the system. This type of control may be characterized as a closed control loop. The size of the increment and the frequency of the change may result in faster or slower system response times with corresponding higher or lower overshoot/undershoot (which may affect system steady state error). In some embodiments, the control system may continuously monitor various system parameters and make adjustments as needed to maintain one or more performance parameters within a range of the desired performance parameters.

In some embodiments, the control system (e.g., through the feedforward controller 303 as seen in FIG. 3) may also use feedforward in its control algorithms to improve various performance parameters and produce a system output that follows a desired trajectory. For example, a control system may store values of various system components at given set points so that the control system may quickly direct system components to a predetermined value when a set point is requested. For example, if a pressure of X psi is requested, and, after several incremental changes to a proportional valve, the control system determines a pressure of X psi has been reached, the control system may store a position of the valve that corresponds to X psi such that if X psi is requested again in the future, the control system may initially direct the valve to the stored position. While the control system may still measure the pressure and determine if an incremental change is needed after the valve is placed in the stored position, the overall system response time may be faster than if the system had started incrementing the valve from its original position without first jumping to the stored position. As an example, if the control system determines that a pressure of 50 psi (pounds per square inch) is achieved when an inlet valve is in a 50% open state, the next time a set point of 50 psi is requested, the control system may direct the valve to 50% open (which may save several iterations of incremental change and re-measuring). In some embodiments, the system may store a controller output (such as valve position) for a range of set points (e.g., store 50% open to correspond to set points between 45-55 psi) such that when a set point is requested, the system can look up a controller output corresponding to the range that the set point falls within. Directing a system component according to a stored value may result in a faster system response time to the requested set point. In some embodiments, stored valve positions (or other controller output) for multiple set points may be stored as feedforward terms along with their corresponding set points in one or more feedforward tables.

In some embodiments, the feedforward tables may be dynamically and continuously updated to compensate for changes (e.g., environmental changes, changes to system parameters or behavior, etc.) to the system over time. For example, as the system heats up or is used for an extended period, a position of 50% open for the valve may no longer correspond to a pressure of 50 psi (e.g., increased system heat may result in higher overall pressure such that a position of 40% open may correspond to 50 psi after 5 minutes of continuous operation). The feedforward tables may thus be updated with new feedforward terms as needed to adapt the system to change.

Figure 1A:
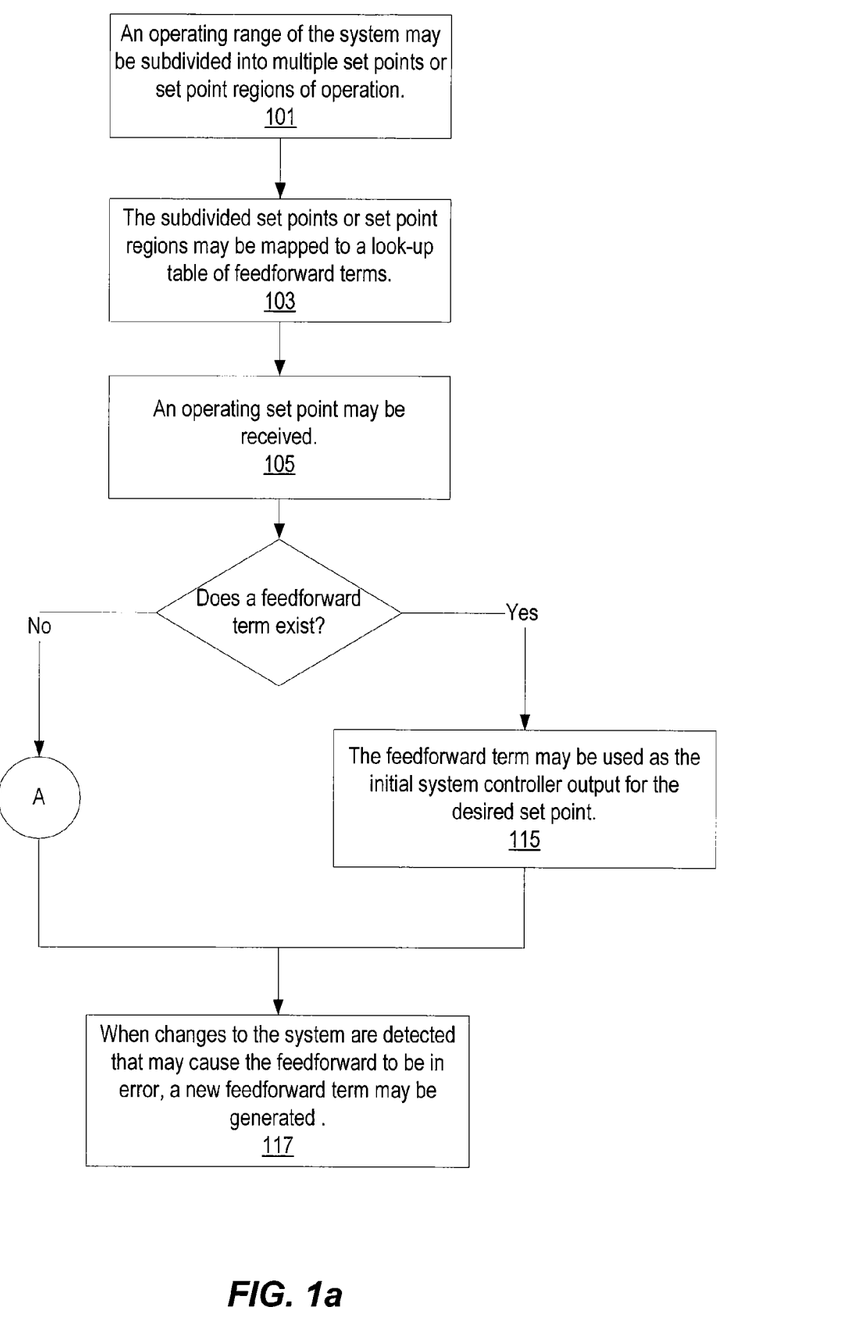
FIGS. 1*a-b* illustrate a flowchart of a feedforward method, according to an embodiment.
Figure 1B:
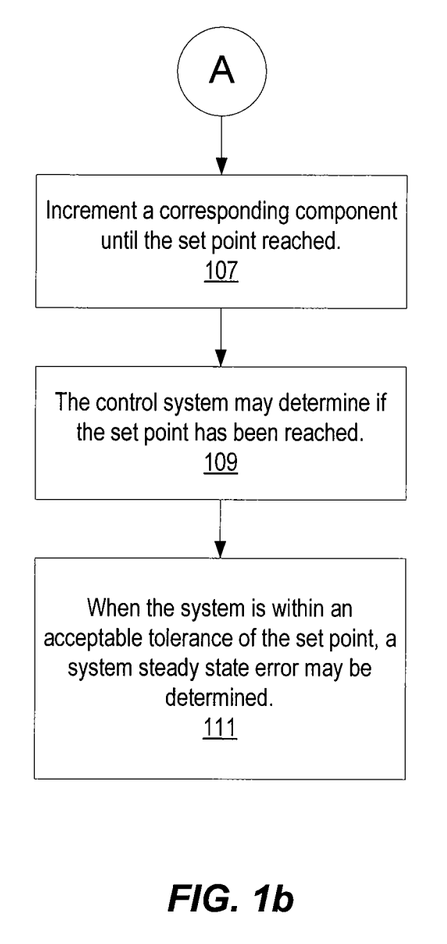

FIGS. 1a-b illustrate a flowchart of a feedforward method, according to an embodiment. The elements provided in the flowchart are illustrative only. Various provided elements may be omitted, additional elements may be added, and/or various elements may be performed in a different order than provided below.

At 101, an operating range of the system may be subdivided into several potential set points or set point regions corresponding to system operation. In some embodiments, the operating range of a performance parameter for a system (e.g., pressure, position, speed, etc.) may be divided into a user provided or system determined number of points or regions. For example, if a system pressure operates over a range of 0 psi to 100 psi and a user or the system requests 10 regions, the subdivided regions may include: 0-10 psi, 11-20 psi, 21-30 psi, 31-40 psi, 41-50 psi, 51-60 psi, 61-70 psi, 71-80 psi, 81-90 psi, and 91-100 psi. This is only one example, other variables and other resolutions are also contemplated. For example, an operating range of 0 to 5 volts (V) may be subdivided into 100 regions (0-0.05 V, 0.06-0.10 V, . . . ). In some embodiments, specific values may be used instead of or in addition to regions. For example, the operating pressure of 0 psi to 100 psi may include: 10 psi, 20 psi, 30 psi, 40 psi, 50 psi, 60 psi, 70 psi, 80 psi, 90 psi, and 100 psi. In some embodiments, the points/regions may not be equally subdivided. For example, certain regions of the operating range may be subdivided with a greater resolution than other regions. As an example, the 10 regions for the operating pressure of 0 psi to 100 psi may include: 0-15 psi, 16-30 psi, 31-45 psi, 45-47 psi, 48-50 psi, 51-52 psi, 53-55 psi, 56-70 psi, 71-85 psi, and 86-100 psi. Different resolutions in different parts of the range may allow finer control in portions of the range that are operated in more frequently.

Figure 2A:
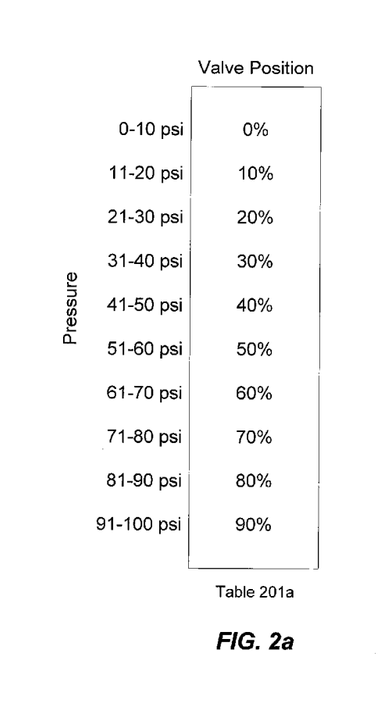
FIGS. 2*a-c* illustrate embodiments of feedforward tables.
Figure 2B:
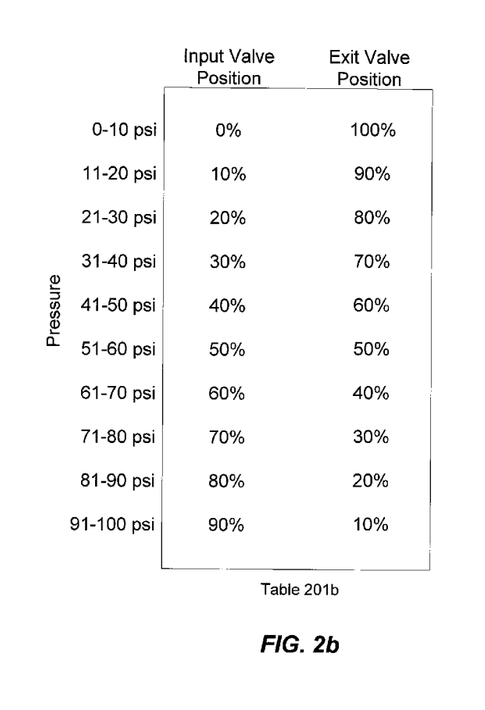
Figure 2C:
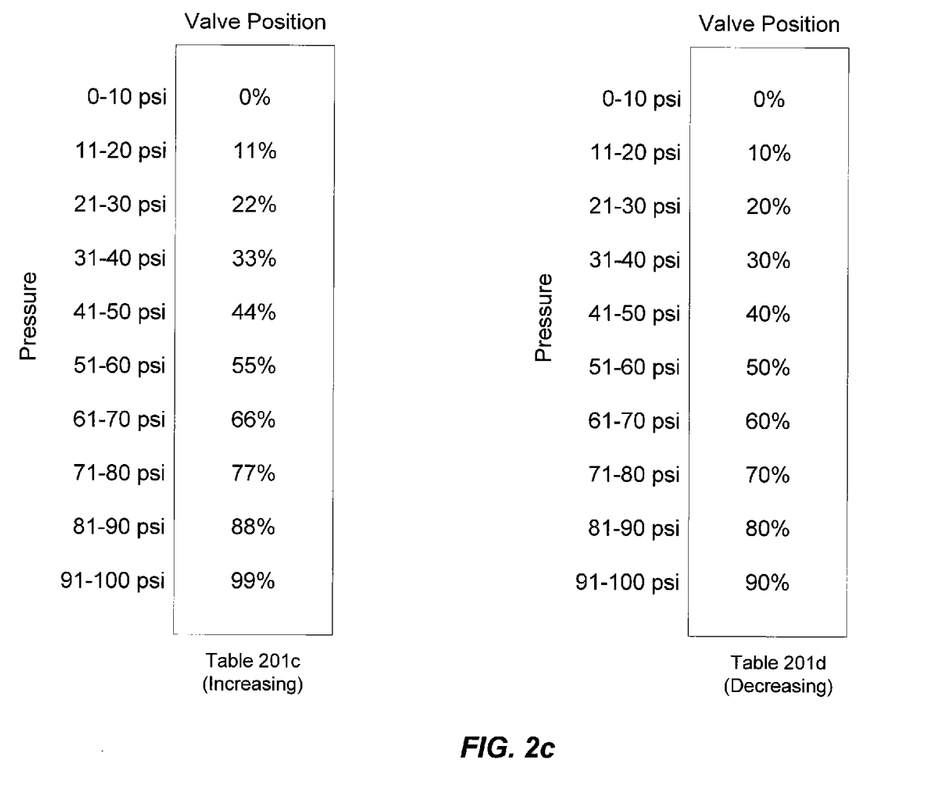

At 103, the subdivided set points or set point regions may be mapped via a look-up table to feedforward terms (controller outputs). FIG. 2a illustrates an example of a look-up table 201a with the subdivided operating range (in this case, pressure) mapped to corresponding feedforward terms (in this case, valve position in percent open state). In some embodiments, the subdivided set points or set point regions may be mapped to multiple feedforward terms. FIG. 2b illustrates an example of a look-up table 201b with the subdivided operating range mapped to corresponding multiple feedforward terms (in this case, input valve position and exit valve positions in percent open state). For example, when a set point of 45 psi is requested, the system may use initial controller outputs of 40% input valve position and 60% exit valve position. In some embodiments, the subdivided set points or set point regions may be mapped to multiple look-up tables (e.g., each with different variables or each relevant to a particular system operating mode/condition). FIG. 2c illustrates an example of two look-up tables, one look-up table 201c with subdivided operating range mapped to feedforward terms to use if the pressure is increasing and a second look-up table 201d to use if the pressure is decreasing. In some embodiments, the feedforward terms may be pre-populated (e.g., according to factory defaults, a prior system run, etc). For example, all of the feedforward terms may be set to 0. In some embodiments, the feedforward terms may be populated/updated in the look-up table as the system operates (see below).

At 105, an operating set point may be received. For example, an operating parameter (e.g., pressure, position, speed, etc.) may be received from a surgical console, footswitch, keyboard, etc. The set point may be received as a user input or may be received as part of a program (e.g., an executing surgical program may direct different set points during different parts of a surgical procedure). In some embodiments, the control system may access a corresponding feedforward table to determine if a feedforward term exists for the requested set point.

At 107, if a feedforward term does not already exist, the control system may increment a corresponding component (e.g., move a valve) to move the system toward the desired set point. The control system may continue to receive relevant measurements (e.g., pressures, temperatures, etc.) and continue to reevaluate whether to increment the component again, undo the previous increment, or not increment the component. In some embodiments, incrementing procedures (e.g., increment sizes and directions relative to measured system parameters) may be preprogrammed into the control system. For example, a controller of the control system may be programmed to close a valve incrementally to reduce system pressure.

At 109, the control system may determine if the set point has been reached. For example, relevant system measurements (e.g., obtained by system sensors) may be compared to the set point (e.g., pressure in a chamber compared to the desired set point pressure) to determine if the relevant system measurement is within a tolerance of the desired set point (e.g., measured pressure within +/−1%, +/−1 psi, etc. of desired set point pressure). Other ranges are also contemplated (e.g., +/−5%, +/−10%, etc). The tolerance may be user provided, predetermined, system default, etc.

At 111, when the system is within an acceptable tolerance of the set point, the system steady state error may be determined. In some embodiments, the controller may continue to receive system measurements (e.g., sensor values) and may continue to provide controller output to a relevant system component even after the initial set point is achieved within the tolerance. For example, the controller may provide output on a periodic basis (e.g., every 0.1 seconds). Other periodic time periods are also contemplated. In some embodiments, the controller output may be substantially the same while the controller is maintaining the desired set point. However, in some cases, the controller may vary the controller output to compensate for system fluctuations. In some embodiments, determining a system steady state error may include comparing a mean of multiple samples of the controller output (e.g., valve position) to a standard deviation of the controller output. The number of samples to use for the comparison may be predetermined (e.g., 100) or samples for the comparison may continue to be accrued until the next set point change (e.g., when a user inputs a new set point).

At 113, if a measure of steady state error (e.g., a ratio of standard deviation to the mean of the accrued samples of the controller output) is within an acceptable range, the feedforward table may be updated with the value of the mean of the controller output (or another relevant system value). For example, if the standard deviation of the sampled controller output divided by the mean of the sampled controller output is <a predetermined value (e.g., 0.1, 0.4, etc.), the feedforward table may be updated with the value of the mean of the controller output. Other measures of steady state error are also possible (e.g., based on comparisons of variance to mean). Other criteria for storing a feedforward term are also contemplated. For example, if a feedforward term does not yet exist for the set point, a mean of the controller output for the set point may be automatically entered without determining a measure of steady state error. As another example, the system may determine whether to keep the controller output based on the standard deviation and/or mean of a sensor measurement (e.g., based on a determination of how steady the system pressure is during the controller output).

At 115, if the feedforward term exists for the desired set point, the feedforward term may be used as the initial system controller output for the desired set point. The controller may receive data (such as sensor data) to determine if additional adjustments need to be made to reach the desired set point (or come within an acceptable tolerance of the set point). In some embodiments, the feedforward term may be updated if additional adjustments are needed and/or the system steady state error is within an acceptable tolerance.

At 117, when changes to the system are detected that may cause the feedforward terms in the table to be in steady state error (e.g., if the detected temperature of the system changes), new feedforward terms may be determined (e.g., going forward) for the set points in the table. For example, if the system temperature changes more than X degrees (e.g., where X may be a user input or system default) the feedforward terms may be flagged, set to a default value, etc. Determining when to replace feedforward terms may be based on other system characteristics (e.g., operating time, system mode, type of tool being used, etc). In some embodiments, when a decision is made to replace the feedforward terms the previous feedforward terms may continue to be used as initial controller outputs but may be flagged for replacement when a new feedforward value can be determined (e.g., based on a mean of subsequent controller outputs for the corresponding set point). Thus the dynamic and continuous updating of feedforward terms may compensate for changes in the system or environmental conditions (e.g., temperature and pressure) resulting in faster response times and better tracking. In some embodiments, new feedforward terms may be calculated each time a set point is entered (e.g., each time the system reaches a set point value and the measure of steady state error is within an acceptable tolerance, the corresponding controller output (or mean of the controller output) may be used to update the corresponding feedforward term for that set point in the feedforward table).

In some embodiments, the feedforward method described in FIGS. 1*a-b* may be used to control pressure of an accumulator tank (or other reservoir) by controlling a proportional valve that supplies the accumulator tank. In some embodiments, one or more feedforward look-up tables (e.g., as seen in FIG. 2) may be created (e.g., table 201 for increasing output and table 203 for decreasing output). In some embodiments, the valve may have non-linear behavior as a function of the pressure drop across the valve (input pressure-set point) resulting in different feedforward values for the different input pressures. In some embodiments, two tables may be used to compensate for increased hysteresis in a valve output (e.g., the valve may experience dynamic-behavior changes as a function of temperature over time such that one table may be used when the input pressure is increasing and one table used when the input pressure is decreasing). In some embodiments, a range of set points may be divided into a number of segments depending on a desired resolution (e.g., in this example, 20 segments may be used to achieve a resolution of approximately 5%). Other numbers of segments and other resolutions are also possible (e.g., 1%). When a new set point is utilized by the system, the overall controller output may be averaged over a number of samples when the output reaches the desired set point (or, for example, within an error tolerance of the set point):

$S_K$ = set point closest to the table entry $K$ (where $K$ may be provided as a selected point or range of points provided in the table)

$U_K^i$ = controller output (e.g., actuating signal for a valve being controlled) needed to maintain setpoint $S_K$ at time instant for sample $i$ $T_K^+$ = the feedforward table entry corresponding to $S_K$ in the positive direction $T_K^-$ = the feedforward table entry corresponding to $S_K$ in the negative direction $$T_K^+ = \frac{1}{N} \sum_{i=1}^{N} U_K^i = \text{mean of controller output}$$

if $S_K$ was in positive direction $$T_K^- = \frac{1}{N} \sum_{i=1}^{N} U_K^i = \text{mean of controller output}$$

if $S_K$ was in negative direction

The standard deviation of the mean may also be calculated:

$$\sigma_K^+ = \left(\frac{1}{N-1}\sum_{i=1}^{N}(U_K^i - T_K^+)^2\right)^{\frac{1}{2}} = \text{standard deviation associated with } T_K^+$$

$$\sigma_K^- = \left(\frac{1}{N-1}\sum_{i=1}^{N}(U_K^i - T_K^-)^2\right)^{\frac{1}{2}} = \text{standard deviation associated with } T_K^-$$

If the ratio of the standard deviation to the mean (e.g., $$\frac{\sigma_K^+}{T_K^+} \text{ or } \frac{\sigma_K^-}{T_K^-})$$

is within an acceptable tolerance (e.g., less than 0.1), the mean value ($T_K^+$ or $T_K^-$) may be assigned (i.e., used as the feedforward term) to the nearest neighbor (e.g., nearest value or nearest range of values) of the set point in the feedforward look-up table. Other acceptable tolerances are also contemplated (e.g., less than 0.1, 0.2, 0.4, etc). If the ratio is not within the tolerance, the newly calculated feedforward term may be considered too noisy and the previous value (or no value) may be kept in the table. Obtaining feedforward terms may be repeated as different set points are requested (e.g., for different requested input pressures).

In some embodiments, additional parameters/tables may be needed. For example, in controlling a proportional valve, the input pressure to the proportional valve may vary and alter necessary valve positions. In the case of the proportional valve, the controller output may be dependent on the set point and inlet pressure. In this case, the inlet pressure may also need to be divided into increments (e.g., 5 psi) and one set of tables per increment of pressure may be developed. The dedicated tables for each region may be updated depending on the particular input pressure at the time a feedforward term is determined. Likewise, the current input pressure may be used in the look-up process to determine controller output needed for a certain set point at the current input pressure.

An example control system is shown in FIG. 3. In some embodiments, control systems may include a feedback controller 301 that implements feedback control algorithms (e.g., which include feedback) and a feedforward controller 303 that implements feedforward control algorithms (using feedforward look-up tables 321), in hardware, firmware, logicware, or software. In some embodiments, feedforward may utilize knowledge of system behavior to improve performance values such as rise time, fall time, tracking, or disturbance rejection in a system or other values that may depend on an input 305 (e.g., input pressure) to the feedback controller 301 and may be independent of an output 307 of the controller 301). The system may include other components such as a digital to analog converter 309, amplifiers 311/317, actuator 313 (e.g., a valve actuator that responds to the controller output 307), sensor 315 (e.g., which may provide pressure measurements or other measurements that may indicate if the set point has been reached), and an analog to digital converter 319. In some embodiments, the feedforward look-up tables 321 may be stored on the controller 303 or on a memory accessible to the controller 303.

In some embodiments, the control system may include one or more processors. The processor may include single processing devices or a plurality of processing devices. Such a processing device may be a microprocessor, controller (e.g., controllers 301 and 303) (which may be a micro-controller), digital signal processor, microcomputer, central processing unit, field programmable gate array, programmable logic device, state machine, logic circuitry, control circuitry, analog circuitry, digital circuitry, and/or any device that manipulates signals (analog and/or digital) based on operational instructions. A memory coupled to and/or embedded in the processor may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processors implement one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory may store, and the processor may execute, operational instructions corresponding to at least some of the elements illustrated and described in association with FIGS. 1a-b.

Figure 4:
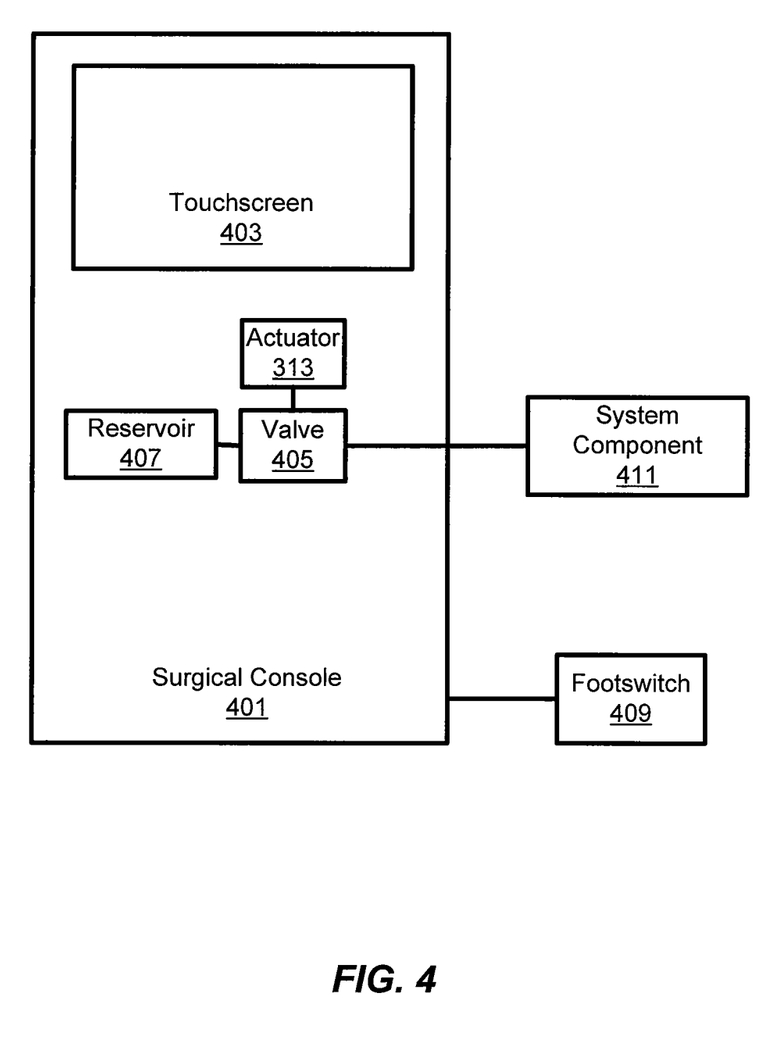
FIG. 4 illustrates a surgical console, according to an embodiment.

FIG. 4 illustrates a surgical console, according to an embodiment. As seen in FIG. 4, the surgical console 401 may include a touchscreen 403, reservoir 407, valve 405, and actuator 313. The surgical console 401 may be coupled to a footswitch 409. As further seen, the system component 411 (e.g., a vitrectomy probe) may be coupled to the surgical console (e.g., through one or more tubings). Other configurations of the surgical console 401 are also contemplated. In some embodiments, the system component 411 may be internal to the surgical console 401 (e.g., the system component 411 may include the valve 405). Other system components 411 are also contemplated (e.g., the system component may include a phacoemulsification handpiece).

Various modifications may be made to the presented embodiments by a person of ordinary skill in the art. Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method, comprising:
   subdividing an operating range of a system component of a system into two or more set points or set point regions of operation;
   creating a feedforward table for mapping feedforward terms to the two or more set points or set point regions of operation;
   receiving a desired set point;
   determining if a feedforward term exists for the desired set point;
   if the feedforward term does not exist for the desired set point,
   incrementing a system component as needed using controller output to move the system to within a first acceptable tolerance of the desired set point;
   determining if a measure of steady state error for the system is within a second acceptable tolerance;
   if the measure of steady state error for the system is within the second acceptable tolerance, recording a feedforward term, corresponding to a current controller output, in the feedforward table for the current desired set point;

if the measure of steady state error for the system is not within the second acceptable tolerance, not recording a feedforward term in the feedforward table for the desired set point;

if the feedforward term does exist for the operating set point, controlling the system component using controller output that corresponds to the feedforward term associated with the desired set point to move the system toward the desired set point; and when a change to the system is detected that is associated with possible changes to the feedforward terms, generating one or more new feedforward terms for the feedforward table.

2. The method of claim 1, wherein the change to the system that is associated with a possible change to the feedforward terms includes a change in temperature.

3. The method of claim 1, wherein generating new feedforward terms when a change to the system is detected includes recording a new feedforward term if a measure of steady state error for the system is within the second acceptable tolerance when the system is subsequently within a first acceptable tolerance of the desired set point.

4. The method of claim 1, wherein determining the measure of steady state error for the system comprises calculating a standard deviation and a mean of multiple samples of controller output during the time the system is within the first acceptable tolerance of the desired set point, wherein the determined measure of steady state error for the system is the standard deviation divided by the mean.

5. The method of claim 1, wherein the first acceptable tolerance is in a range of 0.1 to 0.4.

6. The method of claim 1, wherein the desired set point is a reservoir pressure and wherein the controller output and feedforward terms comprise valve positions of a valve coupled to a reservoir.

7. The method of claim 1, wherein the set point operating range is a range of reservoir pressures.

8. The method of claim 1, wherein the system is a surgical system and wherein the desired set point is received through a touchscreen or footswitch of a surgical console.

9. The method of claim 1, wherein the operating range is subdivided according to a resolution provided by a user of the system.

10. The method of claim 1, wherein the feedforward table is not populated prior to operating the system component and wherein the feedforward terms are determined and used to populate the feedforward table during subsequent system component operation.

11. The method of claim 1, wherein the feedforward table is populated prior to operating the system component with calculated or default feedforward terms and wherein updated feedforward terms are determined and used to overwrite existing feedforward terms in the table during subsequent system component operation.

12. A method of using a feedforward table to control a surgical system component of a surgical system, comprising:
receiving a desired set point;
determining if a feedforward term exists in the feedforward table for the desired set point, wherein the feedforward table comprises a plurality of set points;
if the feedforward term does not exist for the desired set point,
incrementing the system component as needed using controller output to move the system to within a first acceptable tolerance of the desired set point;
determining if a measure of steady state error for the system is within a second acceptable tolerance;
if the measure of steady state error for the system is within the second acceptable tolerance, recording a feedforward term, corresponding to a current controller output, in the feedforward table for the desired set point;
if the measure of steady state error for the system is not within the second acceptable tolerance, not recording the a feedforward term in the feedforward table for the desired set point;
if the feedforward term does exist for the desired set point, controlling the system component using controller output that corresponds to the feedforward term associated with the desired set point to move the system toward the desired set point;
when a change to the system is detected that is associated with possible changes to the feedforward terms, generating one or more new feedforward terms for the feedforward table.

13. The method of claim 12, wherein the change to the system that is associated with a possible change to the feedforward terms includes a change in temperature.

14. The method of claim 12, wherein generating new feedforward terms when a change to the system is detected includes recording a new feedforward term if a measure of steady state error for the system is within the second acceptable tolerance when the system is subsequently within a first acceptable tolerance of the desired set point.

15. The method of claim 12, wherein determining the measure of steady state error for the system comprises calculating a standard deviation and a mean of multiple samples of controller output during the time the system is within the first acceptable tolerance of the desired set point, wherein the determined measure of steady state error for the system is the standard deviation divided by the mean.

16. The method of claim 12, wherein the desired set point is a reservoir pressure and wherein the controller output and feedforward terms comprise valve positions of a valve coupled to a reservoir.

17. The method of claim 12, wherein the system is a surgical system and wherein the desired set point is received through a touchscreen or footswitch of a surgical console.

18. The method of claim 12, wherein the feedforward table is not populated prior to operating the system component and wherein the feedforward terms are determined and used to populate the feedforward table during subsequent system component operation.

19. The method of claim 12, wherein the feedforward table is populated prior to operating the system component with calculated or default feedforward terms and wherein updated feedforward terms are determined and used to overwrite existing feedforward terms in the table during subsequent system component operation.

* * * * *